United States Patent

Gibson

[15] 3,641,778
[45] Feb. 15, 1972

[54] APPARATUS FOR DIVERTING A PIPELINE

[72] Inventor: Robert G. Gibson, Houston, Tex.
[73] Assignee: Fluor Ocean Services, Inc., Houston, Tex.
[22] Filed: Jan. 26, 1970
[21] Appl. No.: 5,863

[52] U.S. Cl. ............................................. 61/72.1, 61/72.3
[51] Int. Cl. .................................... B63b 35/04, F16l 1/00
[58] Field of Search ............................. 61/72.3, 72.4, 72.1

[56] References Cited

UNITED STATES PATENTS

| | | | |
|---|---|---|---|
| 3,237,438 | 3/1966 | Tesson | 61/72.3 X |
| 3,266,256 | 8/1966 | Postlewaite et al. | 61/72.3 |
| 3,331,212 | 7/1967 | Cox et al. | 61/72.3 |
| 3,390,532 | 7/1968 | Lawrence | 61/72.3 |

FOREIGN PATENTS OR APPLICATIONS 601,103  4/1948  Great Britain ........................ 61/72.3

*Primary Examiner*—David J. Williamowsky
*Assistant Examiner*—David H. Corbin
*Attorney*—Michael P. Breston and Alfred B. Levine

[57] ABSTRACT

An apparatus for diverting by application of plastic stresses, a moving pipeline between the top and bottom surfaces of a marine body of water. The pipeline is made of an elastoplastic metal pipe having a suitable coating of corrosion-proofing material. The pipe is initially bent at the top water surface to a constant radius of curvature over a finite arcuate length, and subsequently straightened to a substantially rectilinear configuration colinear with the pipe's trajectory. The radius of curvature is sufficient to prevent buckling of the pipeline and the applied moment yields the pipe material in a controlled fashion to obtain a relatively large change of direction in a relatively short finite arcuate length. The application of the moment is such that the coating remains substantially intact and flattening of the pipe's cross section remains negligible. Under such conditions, the constant radius of curvature of the diverted pipe and the finite arcuate length may be selected to allow the diverted pipeline to assume any desired inclination angle without the need of customary expensive and large vertical support structures. Suitably applied tension stress depending on this angle prevents the pipe from buckling at the marine bottom.

1 Claims, 4 Drawing Figures

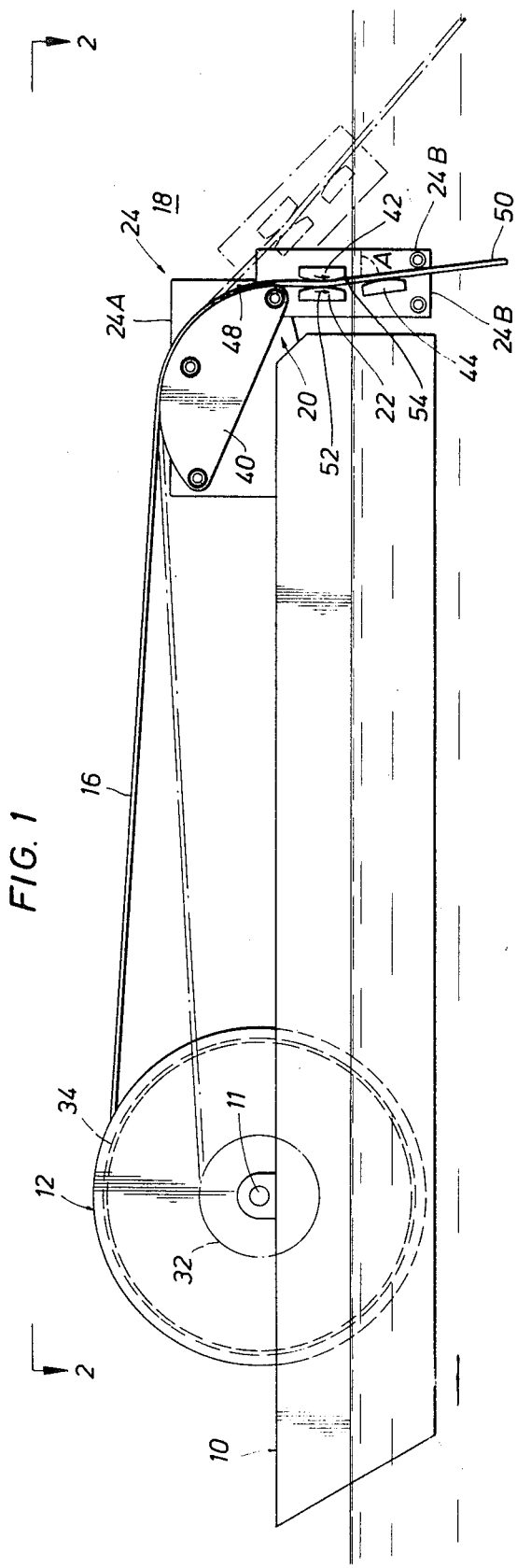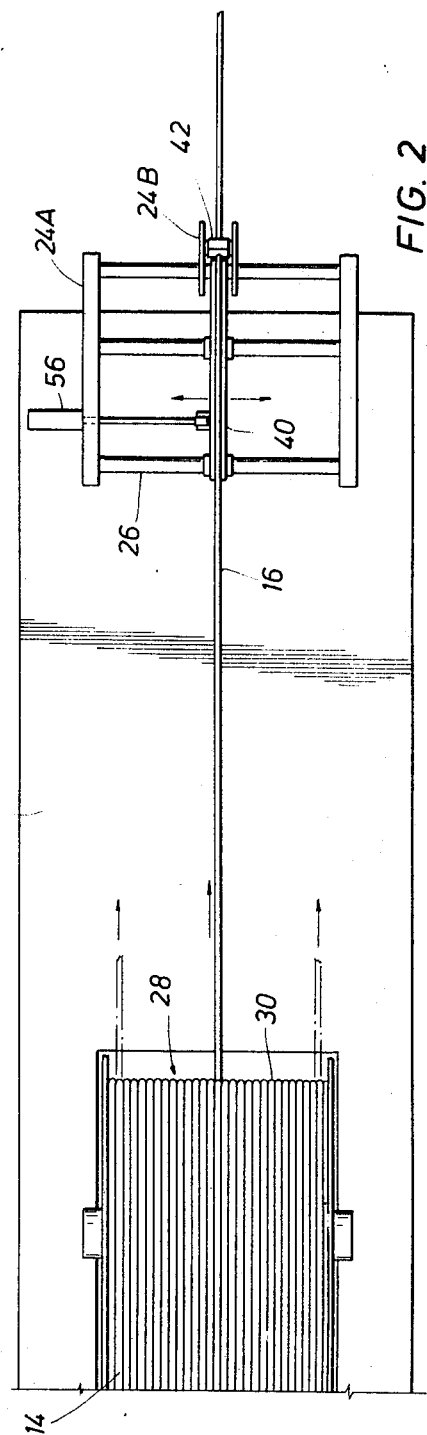

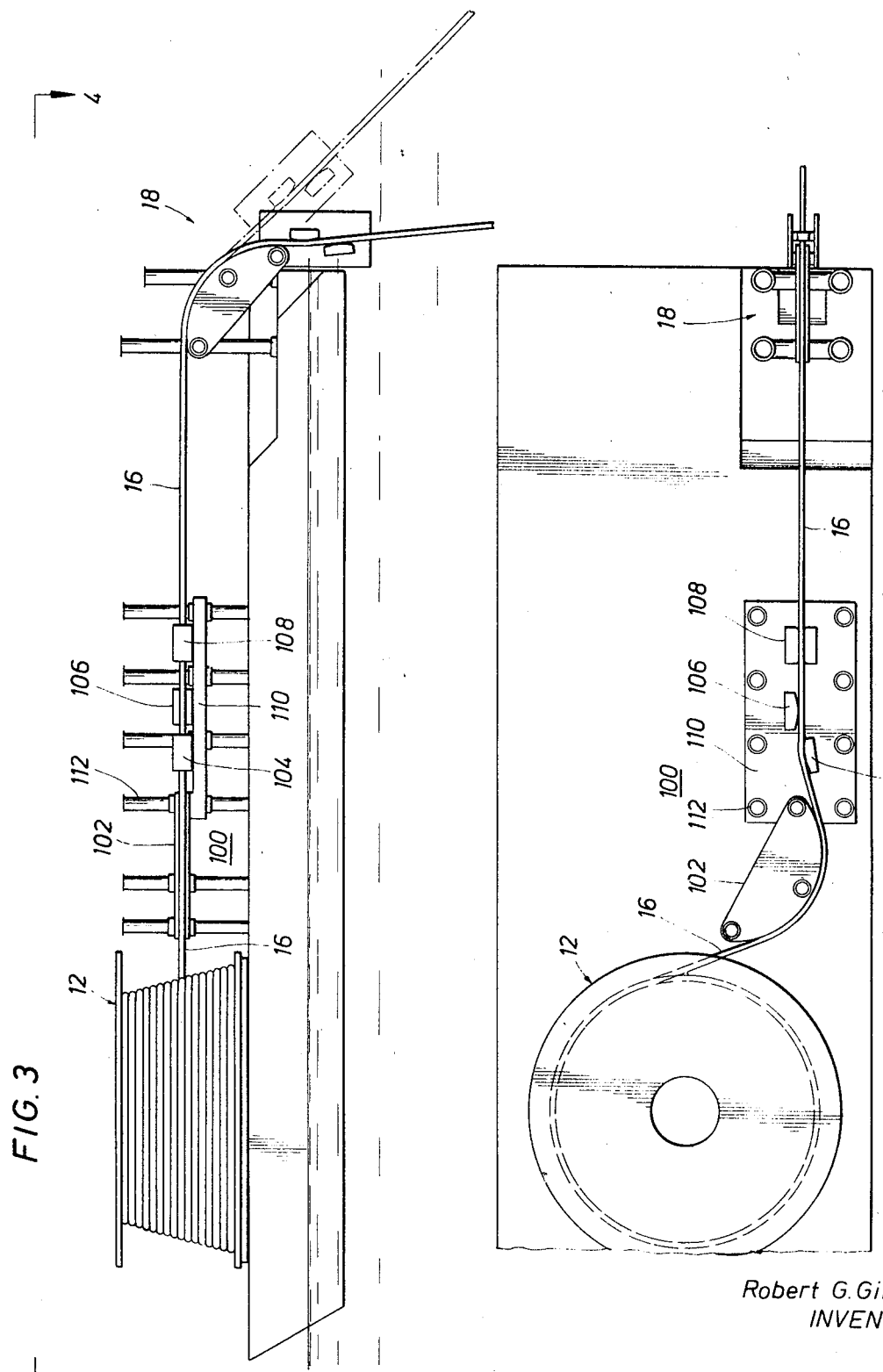

APPARATUS FOR DIVERTING A PIPELINE

CROSS-REFERENCES TO RELATED APPLICATIONS

Particular elements which may be used for this invention are described and claimed in copending patent application Ser. No. 5,842, assigned to the same assignee.

BACKGROUND OF THE INVENTION

1. Field of the Invention

This invention generally relates to the field of diverting an elastoplastic pipeline about a floating platform. The pipe may be continuously payed from or onto a pipe dispensing or storing means.

2. Description of the Prior Art

Diverting an underwater pipeline from a floating platform to a marine bottom required in accordance with prior practice, supporting a span of the pipeline along its arcuate trajectory up to a distance off bottom from which the pipe could safely sag. The employed support structures, commonly called stingers, have as a main object to avoid overbending and possibly buckling the pipe. One such type of stinger is a long, straight, relatively inflexible structure having two buoyant pontoons interconnected by numerous crossovers and containing rollers for movably supporting the diverted pipe. The straight stinger usually descends at an inclination angle substantially the same as that of the barge ramp and discharges the pipe very near to the marine bottom.

Therefore, the length of a straight stinger increases with water depth. Very long stingers are not only very expensive but are also subject to destructive forces which may develop from strong winds, waves and/or storm action. Moreover, such stingers are difficult to disconnect both from the barge and from the pipe when it is desired or necessary to discontinue the pipe-laying operation, as in the event of an impending storm.

Articulated stingers have been proposed for the purpose of shortening the required stinger lengths. Both the straight and articulated-type stingers have a common object: to insure that the radius of curvature of the diverted pipeline is sufficiently long to prevent the pipe from acquiring a residual deformation, that is, to maintain the pipe within its elastic bending range.

By applying adequate tension to the upper end of a pipe span and by maintaining it at a finite inclination angle, theoretical considerations indicate that the lowering of a pipeline from a floating barge to the sea floor may be accomplished without a stinger. For a discussion of such a proposed method reference may be had to an article published by D. A. Dickson, et al. in Ocean Industry, Dec., 1967, pages 32–36, entitled "Laying a Pipeline in Deep Water Under Tension Without a Stinger." For carrying out such a method U.S. Pat. No. 3,266,256 relies on vertically assembling the pipeline on the floating barge by successively placing each length of pipe in a frame 17 and welding it to an adjacent length of pipe extending below it. Such a method is not believed to be readily adaptable for commercial service where cost and speed of operation are the prime considerations. In FIG. 4 of this patent is schematically shown a barge-mounted reel for unwinding a continuous pipeline 44. A suitable device is provided to measure the slope of the "straightened" upper end portion of the pipeline where the latter leaves the pipe-laying barge and enters the water. In this manner a means is provided for constantly determining the slope of the upper end of the pipeline as it is being layed. The rate at which the pipeline is unspooled and the rate at which the pipe-laying barge is moved are controlled to maintain a desired relationship between the inclination angle and the applied tension.

FIG. 4 shows no straightening means. It is assumed that it is intended for the applied tension to straighten the curvature of the unwound pipeline. Such straightening would leave within the pipe a net unbalanced residual moment which would affect the effectiveness of the pipeline both as a structural member and as a conduit.

For a better understanding of the shortcomings of the prior practices as well as of the advantages of the present invention, a simplified review will be given of the bending stress-strain relationship within an elastoplastic metal pipe.

In the elastic or "straight-line" range the stress is proportional to the resulting strain. When the stress is released the strain returns to its original balanced value or zero curvature. The limit of the elastic range is reached when the strain no longer returns to zero curvature. This limit corresponds to the greatest stress the pipe's material can withstand without producing a residual deflection or curvature.

In the plastic or "flat-line" range, the applied bending stress exceeds the pipe's elastic limit, and the proportional stress-strain relationship no longer holds. For a small increase in applied bending stress, there now is obtained a substantially greater increase in resulting curvature. The boundary between the elastic range and the plastic range is commonly referred to as the yield point.

As one continues to bend the pipe past its yield point, the bending stress or moment increases relatively slowly toward an ultimate value. The pipe's curvature on the other hand increases to a critical curvature at which buckling impends. After the ultimate value, the reduced resistance to bending, due to flattening, will no longer support the applied moment and the pipe will buckle. Under these conditions, the use of the pipe either as a structural member or as a conduit may be seriously affected.

Although mathematical theories of plasticity deal with "ideal" plastic metals, commercially available line pipe metals deviate somewhat from the ideal. It is therefore best to experimentally establish design parameters and to measure the applied critical moment which will cause the pipe to bend to its critical curvature. The critical moment is a function of the pipe's diameter, wall thickness and grade.

A material which is plastic becomes elastic when the applied stress is reduced in magnitude below the yield stress. Experimental curves show that upon progressively reducing the applied moment from any point on the "flat" plastic curve, there follows a descending elastic straight line substantially parallel to the original elastic line. The residual curvature is that curvature which remains after the applied moment is reduced to zero. The progressive reapplication of the moment to the pipe will follow an ascending elastic straight line from the residual curvature which is substantially parallel to the original elastic line, and subsequently this ascending elastic line will join the plastic line after the yield point of the pipe's material is reached.

Since throughout this disclosure "curvature" is used extensively, a definition of the term will be given. In mathematical terms the radius of curvature of a segment of a curve is the reciprocal of the curvature K, that is 1/K, in which K is equal to the change in the direction of the curve per unit length of arc. The radius of curvature of a straight line is infinite and that of a circle is the radius used to generate the circular curve. The radius of curvature of a complex curve is a variable which depends upon the curvatures of the infinitesimally long circular arcs located at adjacent points on the curve. An inflection point is a point where the pipe's curvature changes signs.

SUMMARY OF THE INVENTION

It is an object of the present invention to overcome the above-mentioned prior art shortcomings and to provide a new and improved method and apparatus for diverting pipelines about floating platforms. The embodiments require a minimum of adjustments, hand labor, complex instrumentation, deck space and pipe support structures.

These and other readily apparent objects are accomplished in accordance with a broad method aspect of this invention by: initially bending the pipe span emerging from the platform to a desired radius of curvature sufficient to prevent buckling. The pipe is bent over a finite arcuate length and subsequently straightened along a selected trajectory. In accordance with a specific method aspect of this invention, said radius is made substantially equal to or greater than the minimum radius required to prevent buckling of the greatest diameter pipe anticipated to be conveyed and diverted about the platform. The straightened pipe is then diverted preferably under suitable tension corresponding to a selected angle of inclination with respect to the water surface.

BRIEF DESCRIPTION OF THE DRAWINGS

FIG. 1 is a side elevation view illustrating a preferred embodiment of the invention;

FIG. 2 is a top view of the embodiment shown in FIG. 1;

FIG. 3 is a side elevation view illustrating another embodiment of the invention; and FIG. 4 is a top view of the embodiment shown in FIG. 3.

Referring now to FIGS. 1 and 2, wherein the showings are only for the purpose of illustrating a preferred embodiment of the invention, and not for the purpose of limiting same, a suitable barge 10 supports a reel 12 for rotation about a horizontal axis 11. Reel 12 winds and unwinds a continuous length of pipeline 14.

Pipeline 14 is preferably made of an elastoplastic steel material of a suitable grade and may have a relatively large diameter, say between 4 to 12 inches, and even higher. For example, a standard X-Grade pipe could be a 12 inch line pipe, Schedule 20 through 80, API 5L, Grade B, seamless, or a 6 inch line pipe, Schedule 20 through 180. For underwater applications, pipeline 14 is ordinarily covered with a suitable protective coating, although such coating is not essential.

It has been found, contrary to what might be expected, that neither the coating nor the pipe becomes damaged by the consecutive bending and reverse-bending operations contemplated by the method of this invention.

Reel 12 can be rotated by any known suitable means. During the winding and unwinding steps, an emerging span 16 of pipeline 14 passes through a diverter system 18 which includes a bending apparatus 20 and a tension-control mechanism 22. System 18 is mounted on a platform 24 which is reciprocable horizontally on a plurality of posts 26.

Pipeline 14 is wound into a multilayer coil 28. Each pipe layer includes several pipe convolutions 30. The radius of curvature of the pipe's span 16 when emerging from the innermost layer 32 has the smallest radius of curvature and when emerging from the outermost layer 34 has the largest radius of curvature. Thus, the emerging pipe span 16 has a variable curvature.

As can be seen from FIG. 1, when the pipe span 16 emerges from the outermost layer 34 it is at a maximum angle of one polarity relative to the horizontal, and when it issues from the innermost layer 32 it is at a maximum angle of an opposite polarity. Thus, the emerging pipe span 16 has a variable angle of entry into the bending apparatus 20. The instantaneous magnitude of the angle depends on the diameter of the particular convolution 30 from which pipe span 16 emerges. The exact configuration of the emerging pipe span 16 between reel 12 and apparatus 20 depends on the physical characteristics of pipeline 14 and the stresses within the pipe.

Bending apparatus 20 is adapted to receive the emerging span 16 at a variable angle of entry and at a variable curvature and to automatically bend and straighten the pipe so as to render it substantially free of residual stresses and strains for subsequent discharge into the body of water. To better appreciate the present invention, each of the basic components of apparatus 20 will be discussed in some detail; however, it is understood that various structural changes may be made in some or all of these components without departing from the scope of the present invention. The detail structure of the apparatus 20 is fully described and claimed in said copending application Ser. No. 5,842. Hence, only a brief description thereof, sufficient to understand the present invention, is given herein.

The apparatus 20 is designed to compound-bend the emerging pipe span 16. For simplicity of construction, a "three-roll" compound bender is employed which includes three tools 40, 42 and 44 positioned at spaced locations and movably mounted relative to each other and to the barge 10 in a manner subsequently described. Pipe span 16 is extended through these tools, as shown. The peripheral face of each tool has a movable track chain (not shown) bearing resilient blocks that are arcuately shaped to receive and closely engage against one side of the pipe span. The radius of curvature of each chain in each of tools 42 and 44 is adjustable from an infinite radius of curvature (flat) to a minimum radius sufficient to prevent pipe buckling, thereby allowing the variation of the amount of curvature imparted to or removed from the pipe span 16. The bending tool 40, on the other hand, applies a transverse force in a vertical plane operable to impart to pipe span 16 a positive curvature corresponding to the radius of curvature of its peripheral face in engagement with the pipe span 16. The terms positive and negative have been arbitrarily selected only for ease of description. As herein employed, a positive curvature is a curvature the radius of which has a center below the path of span 16 (as shown in FIG. 1) and, conversely, a negative curvature has its center above the path of span 16.

During the winding operation, pipeline 14 was plastically bent by yielding the metal of the pipe to set a positive curvature in each convolution 30. During the unwinding operation, bending tool 40 stresses the emerging span 16 as it passes over it to thereby controllably yield the pipe's material and to plastically bend span 16 to a positive curvature, having a constant radius sufficient to prevent buckling the pipeline.

Accordingly, the emerging pipe span 16 exiting from bending tool 40 at a tangent point 48 will have a constant positive plastic curvature, irrespective of (1) the angle of entry into apparatus 20, and of (2) the diameter of the unwinding coil 28. Hence, the pipeline when entering apparatus 20 has a nonuniform curvature, and when exiting from tool 40 has a uniform curvature. Therefore, bending tool 40 may be considered, in addition to being a pipe diverter, as a curvature uniformizer.

Pipe span 16 is plastically bent on bending tool 40 over a finite selected arcuate length and exits from tool 40 tangent to point 48. It is the function of the remaining tools to transform the curvilinear profile of the diverted span 16 into a rectilinear profile. For this purpose the center bending tool 42 applies a moment to the diverted pipe span 16 which imparts to it a negative curvature. This is accomplished by plastically reverse-bending pipe span 16 to a particular negative curvature. Thereafter, as the pipe moves past tool 42 and toward tool 44, the induced bending moment in span 16 is unloaded along a linearly elastic path, resulting in a pipe profile which is substantially rectilinear and which is characteristic of a state of substantially zero net moment in the diverted pipe span 16. The diverted rectilinear pipe span 16 will discharge on and be colinear with the desired decent trajectory 50 which has a selected angle A with respect to the surface of the body of water. Angle A may range from a low value up to 90° depending on the operating water depth.

To maintain the diverted pipe span 16 under tension while it is being compound-bent by bender apparatus 20 there may be provided the tension tool 22 which is also mounted on frame 24. Tensioner 22 in the preferred embodiment includes around its periphery a track chain opposed to the track chain of bending tool 42. The chain of tensioner tool 22 is powered for rotation and bears resilient blocks having a groove therein so shaped as to receive and snugly engage one side portion of the pipe. The chains of tools 42 and 22 move in the directions indicated by the arrows 52.

It will be apparent that the pipe span 16 between tools 40 and 42 sustains a sign reversal in its curvature and has an inflection point 54 near bending tool 42.

This invention is effective for pipes of different diameters. While in operation relative position adjustments between tools 40, 42, 44 and 22 forming system 18 are not required, it is appreciated that should such adjustments be required, they could be easily provided either for each tool or in a manner as to move the tools through a single control. Such position adjustments could be carried out, for example, with known hydraulically operated cylinders.

As stated, the tensioner 22 is suitably supplied with motive power. On the other hand the tensioner may be eliminated, for example, by securing one end of the pipe to the seabed and pulling the barge by the tugs and the like along the lay line, so that the pipe would be pulled off system 18 by the motion of the barge. The needed tension may also be supplied by reel 12 in a manner well known to the art.

Moreover, though only one reel is shown mounted on barge 10, it will be evident that more than one reel could be employed. In fact, such reels could be stacked and used to pay out a plurality of pipelines simultaneously or sequentially.

Each of tools 40, 42, 44 and 22 may be a wheel or a portion of a wheel. The peripheral face of each of tools 42, 44 and 22 may vary from a straight line to a relatively short radius of curvature. To allow for the processing of pipe of different diameters, the constant radius of curvature for the bending tool 40 is selected so as to be sufficient to prevent buckling of the largest diameter pipe expected to be processed by bending apparatus 20 and to prevent ovaling of the pipe.

One or more support and guide structures (not shown), may be provided if desired to support and guide the rectilinear pipe span 16 exiting from the system 18 along the vertically inclined pipe processing trajectory 50.

Any suitable reciprocating means 56 which may be cam operated and controlled and located inside the posts 26 or outside thereof may be employed to reciprocate horizontally the platform 24 on which is mounted system 18. The reciprocation is synchronized with the rotation of reel 12. Platform 24 is preferably made of two parts 24A and 24B. Platform part 24B is rotatably supported on one of the posts 26 to allow for the adjustment of the inclination angle relative to the water surface, as shown by the dotted line representation in FIG. 1.

The method of the present invention allows the unwinding of a pipeline from a reel at a relatively high rate of speed without the need to continuously manually or otherwise adjust the bending tools of conventional benders. The method accepts pipes of varying diameters and is especially beneficially employed with relatively large diameter pipes, up to 12 inches and higher. The emerging curvilinear pipe span 16 from reel 12 is rendered substantially rectilinear and colinear with the trajectory 50. The diverted pipe span 16 descending along the trajectory 50 is now without appreciable unbalanced residual moments irrespective of the prior loading history of pipeline 14.

Referring now to the other embodiment shown in FIGS. 3 and 4, the same reference characters will be used to designate identical or similar parts when applicable.

In this embodiment reel 12 is mounted for rotation about a vertical axis. The emerging pipe span 16 is curvilinear and is straightened by an aligner and straightener system 100. System 100 is described and claimed in said copending patent application. System 100 includes an aligner 102 for the purpose of stress uniformizing and curvature uniformizing the emerging pipe span 16. The aligned and bent pipe span 16 is counterbent by a working roll 104 which together with an end roll 106 and aligner 102 form a three-roll straightener. Suitable tension may be applied to the emerging pipe span 16 by a tension control mechanism 108. The pipe span 16 emerging from system 100 is substantially rectilinear and moves along a trajectory in a vertical plane. System 100 is mounted on a platform 100 which vertically reciprocates on a plurality of posts 112 in synchronism with the unwinding coil on reel 12.

The diverting of the pipe span 16 from barge 10 is accomplished by the diverter system 18 in a manner previously described in connection with FIGS. 1 and 2, except that in the embodiment of FIG. 3 there is no need to horizontally reciprocate the platform 24.

Accordingly, it will be appreciated that in accordance with this invention the diverted pipe span 16 is bent in its plastic range near the stern of the barge 10 by yielding the pipe's material in a controlled fashion to obtain a relatively large change of direction in a relatively short distance over a finite arcuate length, and subsequently reverse-bending the pipe in order to restraighten it on a selected trajectory. In this manner, the pipe can be bent and diverted to any desired angle including 90° for laying pipelines in medium to very deep waters.

The diverted pipe span 16 then becomes suspended between the seabed and the system 18 and the parameters of usual interest include the amount of horizontal force required to protect the span from buckling, the angle of inclination at the top of the span, the maximum bending moment or stress in the span, the span length, and its projection on the horizontal.

While the description has been so far particularly directed to a preferred apparatus, it will be appreciated that other known tools can be employed for carrying out the novel steps of this invention. For example, a "three-roll" straightener of known design, such as is disclosed in U.S. Pat. No. 3,237,438, can be used after the pipe span 16 exits from the bending tool 40.

While the operation of the disclosed apparatus was particularly directed to the unwinding phase, it will be appreciated that the winding phase can be equally accomplished with the apparatus of this invention. During the winding operation, sections of pipe in standard lengths are moved through a welding station and joined together to form the pipeline.

If a reel is employed, the pipeline is then prebent and wound onto the reel 12 during this joining operation. The prebending is to a curvature depending on the diameter of the reel employed and on the diameter of the pipe.

If a reel is not employed, the sections of pipe after they have been joined together are then fed through the bending and straightening apparatus 20. Any suitable feeding mechanism can be employed for that purpose.

The method and apparatus of this invention are useful both for lowering the pipeline into a body of water and for raising a pipeline from a body of water unto a floating platform such as a barge, as will be apparent to those skilled in the art.

What is claimed is:

1. An apparatus for moving a pipeline between a floating platform and a body of water, said apparatus comprising:
   first means for plastically bending a pipe portion to a generally constant, curvilinear configuration from a generally horizontal orientation aboard said platform toward the bottom of said body of water as the pipeline is being moved between said platform and said body of water;
   said first means being positioned on said platform and extending over the edge of said platform;
   second means for subsequently plastically reverse-bending said pipe portion to a desired configuration after said pipe portion acquires said curvilinear configuration;
   said first means defining a movable curved surface operable to engage said pipe portion;
   means for movably coupling said second means with said first means;
   said first means engaging the longitudinal length of the pipe portion to distribute a bending force on such pipe portion; and
   said second means extending downwardly from the first means and being positioned between the first means and the body of water and having at least one member engaging said pipe portion and displaced toward the longitudinal axis of said pipe portion.

* * * * *